United States Patent
Boehmer et al.

[11] Patent Number: 5,892,927
[45] Date of Patent: Apr. 6, 1999

[54] BUS DELAY COMPENSATION CIRCUITRY

[75] Inventors: David S. Boehmer, Queen Creek; D. John Oliver, Mesa, both of Ariz.

[73] Assignee: Intel Corporation, Santa Clara, Calif.

[21] Appl. No.: 780,202

[22] Filed: Jan. 8, 1997

[51] Int. Cl.$^6$ .............................. G06F 13/00; H03K 5/159
[52] U.S. Cl. ...................... 395/280; 395/285; 395/552; 327/153
[58] Field of Search .................... 395/280, 285, 395/552; 370/519, 230; 365/194; 327/276, 271, 153; 364/431.055

[56] References Cited

U.S. PATENT DOCUMENTS

| | | | |
|---|---|---|---|
| 3,611,435 | 10/1971 | Cooper | 375/211 |
| 3,665,100 | 5/1972 | Pinkham | 358/300 |
| 4,928,000 | 5/1990 | Eglise et al. | 235/380 |
| 5,241,429 | 8/1993 | Holsinger | 360/46 |
| 5,475,690 | 12/1995 | Burns et al. | 370/519 |
| 5,574,866 | 11/1996 | Smith et al. | 395/285 |

*Primary Examiner*—Gopal C. Ray
*Attorney, Agent, or Firm*—Blakely, Sokoloff, Taylor & Zafman LLP

[57] ABSTRACT

Programmable delay compensation for interfacing transceiver with a micro-controller. The total propagation delay in transmitting a symbol across the transceiver and receiving an echo back from the transceiver is programmed by a user or software. Depending upon the protocol used in interfacing and symbol transmission, the total propagation delay, which is stored in a programmable register, is subtracted from prespecified symbol timings so that when the propagation delay is accounted for, the symbols, when echoed, will in reality, match the timings as prespecified by the protocol, so that successive symbols are timed appropriately.

14 Claims, 8 Drawing Sheets

BUS DELAY COMPENSATION CIRCUITRY

BACKGROUND OF THE INVENTION

1. Field of the Invention

The present invention relates to the field of micro-controller devices. More specifically, the present invention relates to the protocols used in bussing and networking of micro-controller devices.

2. Description of Related Art

Certain bussing and networking protocols are based upon transmitting time dependent symbols rather than bits. One such protocol, which is used in automotive production vehicles for data-sharing and diagnostics, is the SAE J1850 Standard, published in "Class B Data Communications Network Interface," Rev. May 1994 by the SAE Vehicle Network for Multiplexing and Data Communications Standards Committee. Recently, Intel Corporation released a protocol handler to be integrated onto micro-controller devices for in-vehicle networks. These in-vehicle networks allow for better on-board diagnostics and allow sensors employed within the automobile to share data to eliminate redundant processing and sensing of information. In-vehicle networks are classified as follows according to the rate of data transmission they are capable of: Class A—Less than 10 Kilobits/second, Class B—Between 10 Kilobits/second and 125 Kilobits/second and Class C—Greater than 125 Kilobits/second. The J1850 protocol is of the Class B type of vehicle networks which are used for diagnostic and non-real-time data sharing applications (those not requiring high speed data transmission for on-the-fly vehicle control).

Micro-controllers, which are primarily digital and which employ J1850 and other such serial data transmission protocols can interface with remote transceivers to lower system cost and add flexibility. As a result, micro-controllers must interface with transceivers which convert TTL Level Digital signals to J1850 bus signals and vice versa. When the transceiver converts signals from the micro-controller, an inherent propagation delay adversely affects the timing of the J1850 symbol as detected on the J1850 bus when the micro-controller is transmitting. Likewise, when the micro-controller is receiving signals from the J1850 bus, another propagation delay due to the transceiver converting the J1850 signals to TTL signals, adversely affects the timing of symbols as detected at the input of the micro-controller.

One solution has been to hardwire delay compensation into each transceiver. However, since compensation must be achieved for the timing of specific bus protocols as well as the transceiver itself, such a solution is inadequate. Furthermore, introducing delay compensation into an analog device entails combining analog and digital circuitry in the same manufacturing process which adds to cost, size and complexity of the transceivers. Another solution is to couple delay compensation onto the micro-controller. However, to date, such solutions are based upon fixed delay compensation without regard to the transceiver specifics. This approach fails to account for the ability of the micro-controller to interface to transceivers with wide specification tolerances and with different types and models of transceivers, each with different delay characteristics.

Thus, a flexible approach is needed that can account for the differences in propagation delay from one model of transceiver to the next so that a micro-controller can be reliably interfaced with any transceiver device, and maintain accurate bus symbol timing when transmitting and receiving signals on the J1850 bus.

SUMMARY

The invention provides a method and apparatus for programmable delay compensation in interfacing a micro-controller with a transceiver. A propagation delay measurement circuitry measures the amount of delay in transmitting a signal from the first device to the second device. The propagation delay register within the micro-controller can be programmed with a propagation delay for the transceiver by a user or software. Compensation circuitry, coupled to the micro-controller adjusts the output symbol timing to compensate for the programmed delay. The programmed delay may be programmed as two values—a transmit delay and a receive delay—which are then added to give the total propagation delay. The total propagation delay is stored in a delay compensation register, also on the micro-controller. The delay compensation circuitry selects, based on the type of symbol to be transmitted, the length of the symbol according to nominal bus specifications. Then, the stored propagation delay is subtracted from the nominal length of the symbol. Finally, the timing of the output symbol is adjusted such that the symbol is active for only that difference.

DETAILED DESCRIPTION OF THE INVENTION

Figure 1:
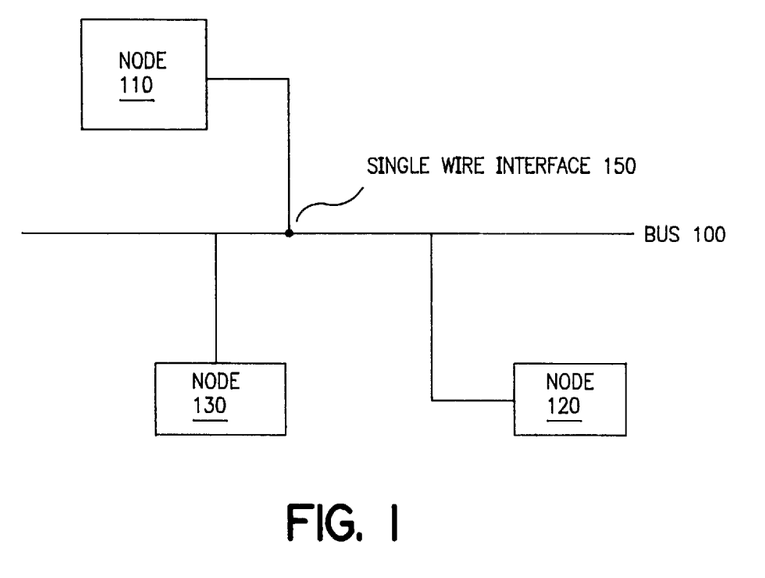
FIG. 1 illustrates an in-vehicle network where delay compensation may be employed.

FIG. 1 shows a typical in-vehicle network. A bus 100 connects together a number of devices or nodes using a single wire interface 150. Bus 100 is, in one embodiment, a bus built to transact data using the J1850 protocol. Thus each of the nodes—node 110, node 120 and node 130—should also be able to recognize the J1850 protocol and transact data according to that protocol. In such an in-vehicle network, node 110 and node 120 may be sensor devices, measuring, for example, the oxygen content of the fuel mixture and the speed of the vehicle. Node 130 may be a diagnostic node which takes the sensor input from nodes 110 and 120 and calculates corrective measures for the fuel mixture. The nodes in an in-vehicle network may range anywhere from diagnostic devices to collision/motion sensors to devices used for a global positioning system (GPS). Whatever the various uses of the nodes, a bus driven system allows data to be shared by any other node in the network without duplicating the function of that node. Thus, the vehicle speed sensor may service the diagnostic node 130 while at the same time be able to provide speed information to another node capable of detecting ahead for vehicle turbulence.

The J1850 protocol, which nodes on bus 100 must follow, is sensitive to symbol timings since it is a variable pulse-width modulation (VPWM) based protocol, in one of its incarnations. In VPWM, every transition (edge) marks the beginning of the next symbol and the end of the previous symbol. Thus, when encoding binary data, a "low" level may be a 1 (if of long width) and a 0 (if of short width). Similarly, a "high" logic level can represent 0 (if of long width) and a 1 (if of short width). Thus, every symbol transmitted must conform to certain width tolerances to guarantee their reliability. One obstacle in this regard is the delay encountered in sending/receiving a symbol on the bus. Each node has a transceiver and a micro-controller and delay is experienced in passing a digital signal from the micro-controller to transceiver for waveshaping and vice versa. Since the transceiver is used in different nodes of an in-vehicle network may have been designed and produced by different manufacturers and according to different specifications, the delays experienced at each node may vary.

Figure 2:
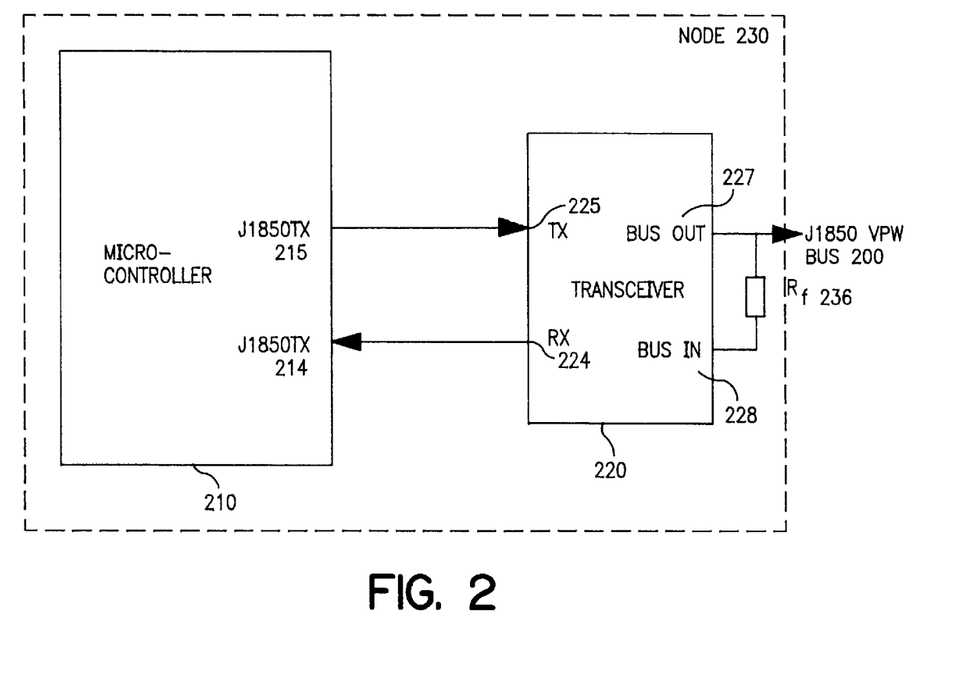
FIG. 2 illustrates the basic signal and bus related components of a node in an in-vehicle network.

FIG. 2 shows the basic signal and bus related components of a node in a J1850 in-vehicle network. Node 230 has two basic components related to data encoding and decoding—a micro-controller 210 and transceiver 220. The transceiver 220 is the interface between the micro-controller 210 and a bus, such as a J1850 bus 200 and waveshapes TTL generated signals from the micro-controller 210 for transport over bus 200. The bus 200 transports data between node 230 and other nodes that may reside on bus 200. If bus 200 is a J1850 bus, as is shown in FIG. 2, then transceiver 220 and micro-controller 210 should be capable of encoding and decoding data according to the J1850 time dependent protocol and thus, transmit/receive symbols using VPWM. The micro-controller is primarily a digital device and is, therefore, most efficiently manufactured using processes (e.g. CMOS) tweaked for digital circuitry. Transceiver 220 on the other hand, contains many analog components and is, thus, most efficiently manufactured using processes tweaked for analog circuitry.

One feature of a J1850 micro-controller is that it simultaneously receives transmitted symbols to verify their behavior on the bus and to time the next symbol. FIG. 2 shows a J1850TX pin 215 on micro-controller 210 which transmits VPW encoded data to the TX receive pin 225 of the transceiver 220. The transceiver 220 waveshapes the digital signal into its analog-like time dependent equivalent for transmission across bus 200. The transceiver sends the waveshaped signal on BUS OUT pin 227 to the bus 200. Since BUS OUT pin 227 and BUS IN pin 228 are both connected to the single wire bus, every transmitted signal is also contemporaneously received (echoed) at the transceiver. Transceiver 224 reverses the wave-shaping for the time dependent received symbol and produces a digital TTL level signal, sending it through the RX send pin 224 to a J1850RX pin 214 on micro-controller 210. However, due to the propagation delay inherent in the transport of the data through the transceiver 220, the echoed data signal arrives at the micro-controller delayed and therefore, could appear to be a different width than the original transmission, and consequently, could be decoded as a different symbol or worse, an invalid symbol. Also shown in FIG. 2 is pull-down resistor $R_f$ 236 connected to the BUS IN pin 228, to accommodate voltage levels of incoming signals, from bus 200.

As mentioned earlier, traditional delay compensation schemes were provided on the transceiver, such as transceiver 220 of FIG. 2, so that the data signal is width-compensated for the delay. Hence, any brand and manufacture of transceiver, as long as it incorporates delay compensation, can be used with a micro-controller. However, this approach suffers in that the cost and complexity of a transceiver is increased by the addition of delay circuitry which is digital in nature. The mixture of analog and digital components on a single "die" (silicon) such as the transceiver, compromises the ability to tweak the manufacturing process properly since analog and digital processes are tweaked in divergent ways.

In other attempted solutions, the micro-controller performs the delay compensation and thus, the problem of the digital vs. analog manufacturing process would be solved. However, these solutions have a fixed delay compensation such that the delay compensation limits the type of transceiver that can be interfaced, so that only transceivers having a delay similarly specified on the micro-controller can be interfaced. A Harris Semiconductor Company built transceiver may have different delay characteristics than a similar device built by Motorola. To implement both the separation of digital and analog manufacturing processes and to ensure that any transceiver may be reliably interfaced to a given micro-controller, programmable delay compensation is needed.

Figure 3:
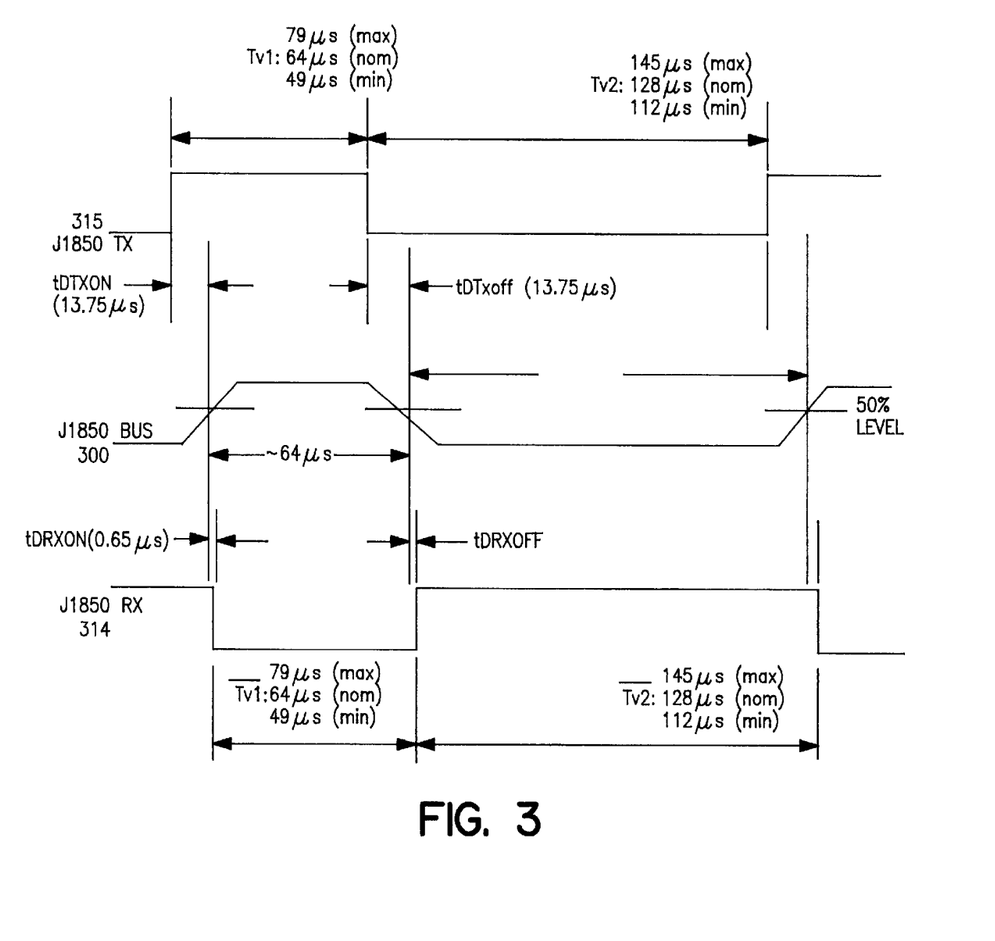
FIG. 3 shows the typical delay and timing values of symbols when an exemplary Harris Semiconductor HIP7020 transceiver is used in conjunction with a J1850 micro-controller such as the 87C196LB micro-controller manufactured by Intel Corporation.
Figure 4:
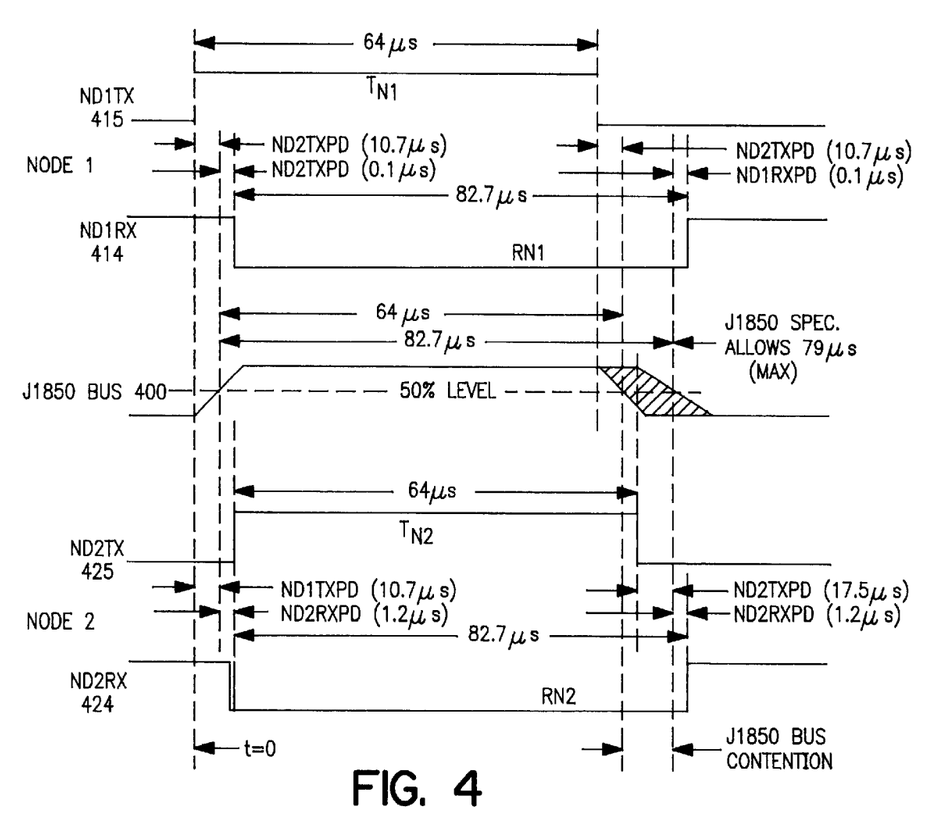
FIG. 4 shows a worst-case scenario for propagation delays and Bus tolerance for a long pulse-width symbol.

The need for delay compensation, programmable or otherwise, is illustrated in timing diagrams of FIGS. 3 and 4. FIG. 3 shows the typical delay and timing values of symbols when an exemplary Harris Semiconductor HIP7020 transceiver is used to interface with a J1850 micro-controller such as the 87C196LB micro-controller manufactured by Intel Corporation.

FIG. 3 shows timings of three signals, a J1850TX (transmitted) signal 315, a J1850 Bus (Bussed) signal 300 and a J1850RX (received) signal 314. According to the J1850 protocol, a high logic level short-width symbol $T_{V1}$ (representing a "1") has a nominal pulse-width of 64 μs with a tolerance of +/−15 μs, yielding a maximum allowable value of 79 μs and minimum allowable value of 49 μs. When the symbol $T_{V1}$ is carried on the transmitted signal 315 and appears on the bus after waveshaping as part of Bussed signal 300, it experiences a propagation delay tDTXON of 13.75 μs through the waveshaping transceiver and is considered "on the bus" when measured at the 50% level of the transition edge.

The value tDTXON represents the time interval from the instant the micro-controller began sending the symbol $T_{V1}$ (as part of transmitted signal 315) to the bus at the point (50% level) when the symbol $T_{V1}$ (as part of bussed signal 300) first appears (is "resultant") on the bus. The value tDTXOFF represents the time interval from the instant the micro-controller stops (finishes holding) the symbol at the bus to the point (50% level) the pulse high in this case when the symbol is seen to end on the bus. The J1850 bus is listening for the end of the symbol $T_{V1}$ before transmitting an echo of $T_{V2}$ out to the bus. Thus, the transmission of each subsequent symbol is time dependent, i.e. dependent on the completion of the previous symbol as is resultant on the bus.

The echo is represented by the received signal 314 which has an inverted symbol $R_{N1}$. The value tDRXON represents the time interval from the instant the bussed signal appears at the transceiver from the bus to the point when the micro-controller sees that echoed received signal 314. Bussed signal 300 is received back at the micro-controller after a delay of 0.65 μs. With reference to the micro-controller, the total propagation delay before the start of the symbol $T_{V1}$ is perceived (echoed back) at the micro-controller is tDON=TDTXON+TDRXON=13.75 μs+0.65 μs=14.4 μs. Likewise, in switching or pulsing off the symbol $T_{V1}$, an equivalent propagation delay tDOFF=tDTXOFF+ tDRXOFF=13.7 $\mu$s+0.65 $\mu$s=14.4 $\mu$s is experienced before the end of the resultant bus symbol is detected (perceived) by the micro-controller.

According to the J1850 protocol, the next symbol $T_{V2}$, which is a long-width symbol cannot be transmitted by the micro-controller until the micro-controller has detected (witnessed) the end of or switching off of symbol $T_{V1}$.

Though 14.4 $\mu$s does not throw the symbol $T_{V1}$ out of tolerance (i.e. nominal time is 64 $\mu$s plus 14.4 $\mu$s delay yields 78.4 $\mu$s<79 $\mu$s max (see FIG. 3)), the dangerous condition is that there are multiple J1850 nodes utilized in a given system, each with transceivers of their own performing the transmission of symbols timed by received resultant bus symbols as shown in FIG. 3. A transceiver at a given node may have different received propagation delays than other transceivers at other nodes which may throw the total timing of the symbol beyond its tolerance in J1850 specification. Even if identical transceivers are used, due to manufacturing peculiarities, the operational characteristics of one transceiver may vary over another enough to throw the symbol timing out of tolerance. Further, if one node leans toward the maximum allowed timing while another node leans toward the minimum symbol timing, the combination of these extremes can create bus aliasing. By performing programmable delay compensation on the micro-controller, any transceiver with any propagation delay characteristic can be interfaced successfully to a micro-controller and with minimum cost.

One critical requirement of the J1850 protocol demands that all transmitting nodes reference their transmit timing from their respective receiver's perception of the previous edge without regard to whether that edge was due to that transmitter or another. Thus, each node in a system has timing dependent on the micro-controller's perception of a transition edge, which necessarily involves delay through the received side of the transceiver of the node.

FIG. 4 shows a problematic scenario for propagation delays throwing symbols out of tolerance for a long pulse-width symbol when two nodes are transmitting the same symbols simultaneously. Assume that a ND1TX (transmitted) signal 415 carrying a single short pulse-width of 64 $\mu$s is transmitted from the remote node 1.

Nodes 1 and 2 are both transmitting a long-width pulse. The transmitted symbol $T_{N1}$ has a propagation delay ND1TXPD when sent through the transceiver out to the bus of 10.7 $\mu$s and a received delay ND1RXPD (echoed back from bus to transceiver to micro-controller) of 0.1 $\mu$s. Node 1 receives an echo $R_{N1}$ of the $T_1$ symbol as part of received signal, ND7RX 414. The transmitted symbol $T_1$ from node 1 is also received at node 2 (seen as $R_{N1}$). All symbols received at node 2 undergo a delay ND2RXPD of 1.2 $\mu$s from bus through transceiver and to micro-controller. The received delay of nodes 1 and 2 are different and this induces part of the problem. Thus, node 2 must wait (ND1TXPD+ND2RXPD=10.7 $\mu$s+1.2 $\mu$s=) 11.9 $\mu$s after node 1 transmits ND1TX out to the bus before it can begin transmitting its long pulse-width symbol $T_{N2}$ as part of transmitted signal ND2TX 425. Since the long pulse-width symbol $T_1$ lasts for 64$\mu$s, the symbols $T_1$ and $T_{N2}$ are observed (resultant) on the bus at overlapping instances. Node 1 forces the bus high (transmits the symbol) for 64 $\mu$s and completes its transmission by pulsing off (transitioning to low).

Node 2, 11.9 $\mu$s after Node 1 began transmitting its 64 $\mu$s symbol $T_1$, transmits its own long pulse-width symbol $T_{N2}$ out to the bus. Though the resultant symbol on bussed signal 400 appears on the bus 10.7 $\mu$s after being transmitted by node 1, the resultant symbol is still held for 64 $\mu$s. Node 2 begins forcing the bus high 11.9 $\mu$s later and thus also transmits its symbol $T_{N2}$ for 64 $\mu$s. However, node 2 has a propagation delay ND2TXPD from the start of transmission to when the symbol is resultant on the bus of 17.5 $\mu$s. The bussed signal 300 is thus held high for (64 $\mu$s+17.5 $\mu$s=) 81.5 $\mu$s. This number exceeds the J1850 maximum tolerance of 79 $\mu$s for a long pulse-width symbol and is thus, out of specification. When node 1 has finished transmitting its symbol $T_1$, it expects the bus to be low and transmits its next symbol (0 or 1) based on the fact the bus is low. However, even after node 1 finishes transmission of $T_1$, shaded in on bussed signal, node 2 is still driving the bus high with $T_{N2}$ due to its 82.5 $\mu$s total time. In this situation, node 1 sees the bus contention. Node 2 will receive an echoed signal of $R_{N2}$ as part of received signal ND2RX 424 from the bus to the transceiver to the micro-controller of an 82.7 $\mu$s length symbol (81.5 $\mu$s+1.2 $\mu$s (received delay)). According to the J1850 protocol, a bussed signal of 82.7 $\mu$s falls out of tolerance, and node 2 will see an invalid symbol.

Thus, delay compensation is required to ensure that the resultant bus symbols, as observed by all nodes including the transmitting node, are not "out-of-specification" and therefore, interpreted as invalid. $R_{N1}$ and $R_{N2}$ are equivalent in length since the echo of all transmitted signals affects every node in the system.

Figure 5:
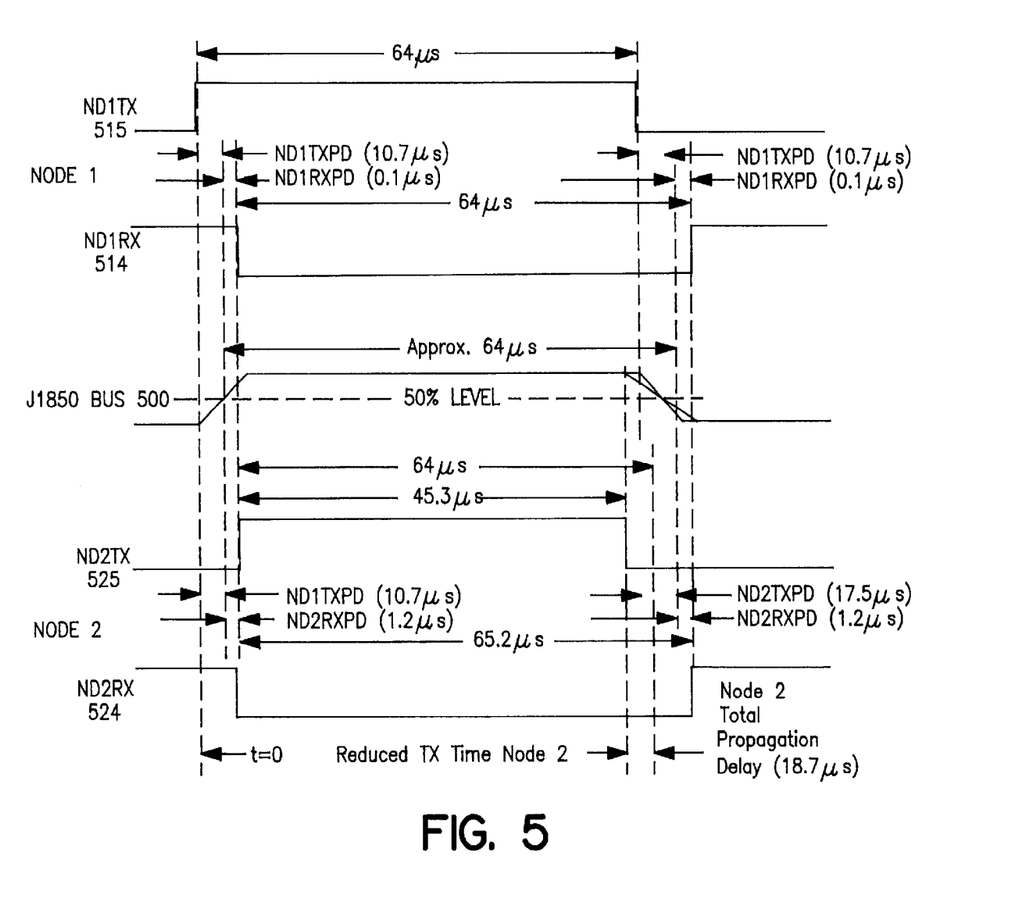
FIG. 5 shows the effect of programmable delay compensation to correct the potential bus contention situation.

FIG. 5 shows the effect of programmable delay compensation to correct the potential bus contention situation of FIG. 4.

Bus contention can occur when two nodes are transmitting symbols at the same time. Both nodes must listen on the bus for echoes of what they transmit in accordance with the J1850 protocol. If both nodes transmit the exact same symbols at the same time, neither node will know what the other is transmitting.

To solve this contention issue, symbols are classified as dominant or recessive. A dominant symbol will overdrive, take priority on the bus and drown out any recessive symbols. The recessive symbols are backed-off and remain at their node until a retry can be achieved. However, other nodes will not know what recessive symbols may lie in wait; only the node that attempted to transmit the recessive symbol will be aware of that fact.

FIG. 5 shows a ND1TX (transmitted) signal 515, a ND1RX (received) signal 514, a bussed signal 500, a ND2TX (transmitted) 525 and a ND2RX (received) signal 524. For node 2, the total propagation delay for receiving an echo from the bus of a node 2 symbol transmitted is (ND2TXPD+ND2RXPD=17.5 $\mu$s+1.2 $\mu$s=) 18.7 $\mu$s. Thus, for a symbol transmitted from micro-controller to transceiver to bus and then to be echoed back at node 2 at the micro-controller of node 2, 18.7 $\mu$s of delay is endured. According to the invention, the propagation delay for node 2 is subtracted from any pulses (symbols) that node 2 drives on the bus such as ND2TX shown in FIG. 5. In the delay compensated case according to the invention, node 1 transmits a long pulse-width symbol (signal) ND1TX 515 lasting 64 $\mu$s. Though the node 1 transmitted symbol 515 may also be delay compensated, for simplicity it is not shown as being compensated. The symbol appears on the J1850 bus as part of bussed signal 500 after 10.7 $\mu$s of delay through the transceiver of node 1. Node 2 perceives the node 1 resultant signal 500 from the bus, but does so only after an additional 1.2 $\mu$s of delay through its transceiver. Thus, 11.9 $\mu$s after the node 1 transmission, node 2 transmits a long-width pulse symbol which is delay compensated by subtracting the node 2 propagation delay of 18.7 μs. Instead of a nominal 64 μs pulse, a pulse of only 45.3 μs is transmitted onto the bus. The pulse is delay compensated for node 2 before transmission out of the bus.

In the delay compensated case, when node 2 listens on the bus for the received echo ND2RX, it will perceive a nominally timed symbol of 64 μs (45.3 μs for the pulse+17.5 μs for transmit delay+1.2 μs for the received delay). The resultant symbol on the bus will appear to drive the bus high for 45.3 μs+17.5 μs=62.8 μs. From the perspective of node 1, the received propagation delay ND1RXPD of 0.1 μs must be endured for node 1 to begin transmitting its next symbol, after the node 2 signal is complete. Thus, after a total of 62.9 μs, which is still within specification, node 1 will interpret a valid symbol and transition to its next symbol.

Since both symbols ND1TX 515 and ND2TX 525 drove the bus at nearly the same time, the cumulative effect of the two symbols must also be considered. Node 1 drove the bus high for 64 μs and 11.9 μs. Later, node 2 began transmitting the ND2TX 525 symbol of 45.3 μs. However, before any symbol results on the J1850 bus, the node 2 propagation delay of an additional 17.5 μs must be endured. The total time the bus will be driven high in the compensated example will be 75.9 μs (11.9 μs+45.3 μs+17.5 μs) which is well within specification. From the perspective of node 1, the echoed signal ND1RX 514 from the bus, which incorporates the echo of ND2TX and ND1TX, will only be low for 64 μs. ND1RX 514 is equal to ND2RX 524 in length since each node receives echoes from transmitted symbols on the bus.

The case above only assumes two nodes. However, as stated earlier, many nodes may be present in a given system. Each additional node adds geometrically to the complexity to the transceiver propagation delay problem which may corrupt symbols on the bus. The propagation delay of each node must be considered in relation to all other nodes if the overall effect of maintaining the J1850 specification is to be achieved. One solution is to program a "delay register" at each micro-controller compensation with a delay value for the transceiver within that node connected to the micro-controller. After all nodes are programmed with values for their respective transceiver's propagation delays, one of two cases may arise. First, all symbols transmitted from any node will appear on the bus as perceived by other nodes as a valid symbol. However, a very high propagation delay at one node may generate a compensated symbol so short in width that, even after adding the transmitting nodes transmit delay and the perceiving node's received delay, the symbol falls under specification. Likewise, a symbol may fall over the tolerance specific for one node due to much delay at both perceived and transmitted nodes. Thus, depending on system constraints, either a single value tweaked for all transceivers must be computed and entered into each delay compensation register or in a perfect case, merely the propagation delay for each transceiver can be entered into the corresponding delay compensation register. Thus, to ensure that all symbols appear "legal", i.e. within the J1850 specifications, the propagation delays through all nodes can be measured and analyzed and then a value determined by the user. Further, by making delay compensation user programmable, any changes in the system topology can be accounted for by adjusting delay compensation register values if necessary.

Figure 6:
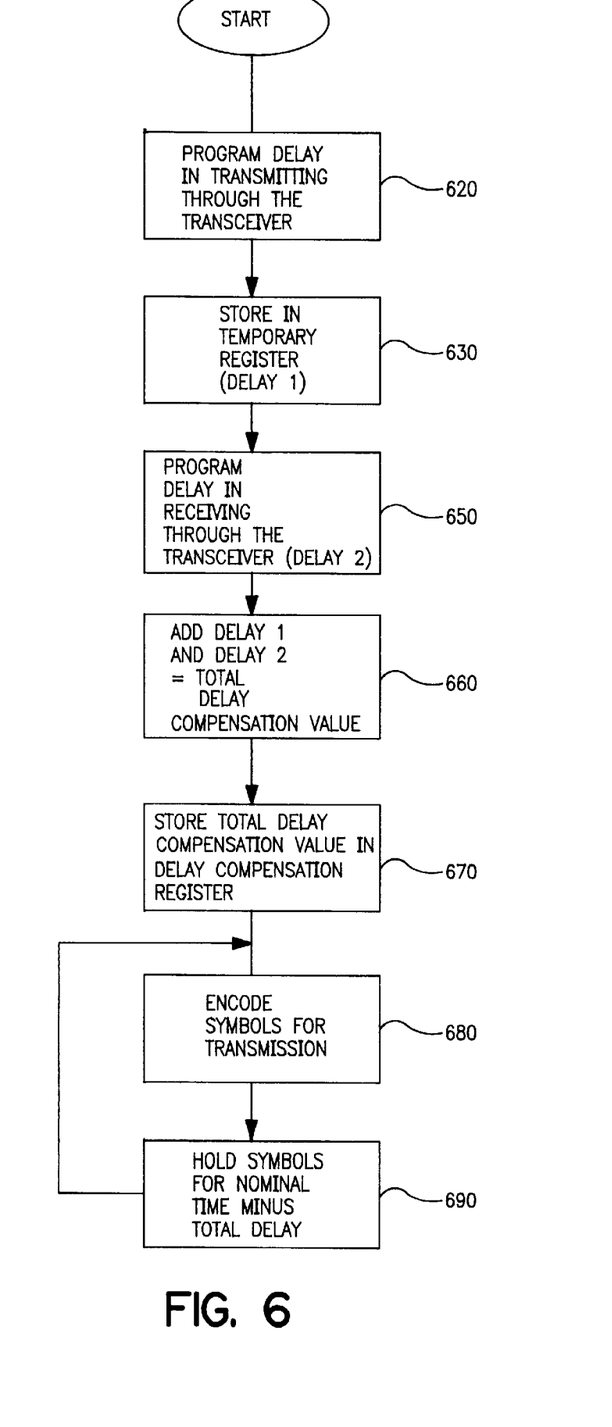
FIG. 6 is a flowchart of the methodology of programmable delay compensation.

FIG. 6 is a flowchart of the methodology of programmable delay compensation according to one embodiment of the invention.

According to step 620, a delay compensation value (delay 1) for transmitting a symbol through the transceiver from micro-controller to bus may be programmed in by user or software. As mentioned above, this value may be tweaked for all nodes in the system or specific only to the node of that particular transceiver. This value is stored in a temporary register (step 630). The user (or software) also programs the delay compensation value (delay 2) in receiving through the transceiver the symbol from the bus at the micro-controller (step 650). Next, according to step 660, the value of delay 1 stored in the temporary register is added to the value of delay 2 to compute a total delay compensation value (step 660). According to step 670, the total delay compensation value is stored in the delay compensation register as a binary value representing the number of microseconds necessary for the delay experienced in transmission and receipt of a transmitted signal and its echo. As mentioned earlier, the total delay compensation value for a transceiver may vary from its propagation delay if other nodes in the system would be adversely affected by the choice. Once the total delay compensation has been programmed, all symbols that are transmitted from the micro-controller are adjusted by the total so that the echo signal received back at the transmitting node's micro-controller is perceived as having nominal symbol timings according to bus specification.

Step 680 of the flowchart shows that the micro-controller encodes data that it receives into a binary form. The symbol encoder circuit within the micro-controller, however, in the invention, will hold symbols as high or low not for the nominal time, but for the nominal time minus the total delay compensation value as stored in the delay compensation register (step 690). Thus, whether the logic level is low or high, a short-width pulse symbol will be held for 64 μs minus the value of the delay compensation register whereas a long-width pulse symbol, whether a high-logic or low-logic level, will be held for 128 μs minus the total delay compensation value stored in the delay compensation register. All other J1850 symbols will be reduced likewise by the value of the delay compensation register. By accounting for the propagation delay due to the transceiver of the transmitting node, it is possible to get subsequent symbols aligned within the specification of the J1850 protocol regardless of the type of transceiver used.

Figure 7:
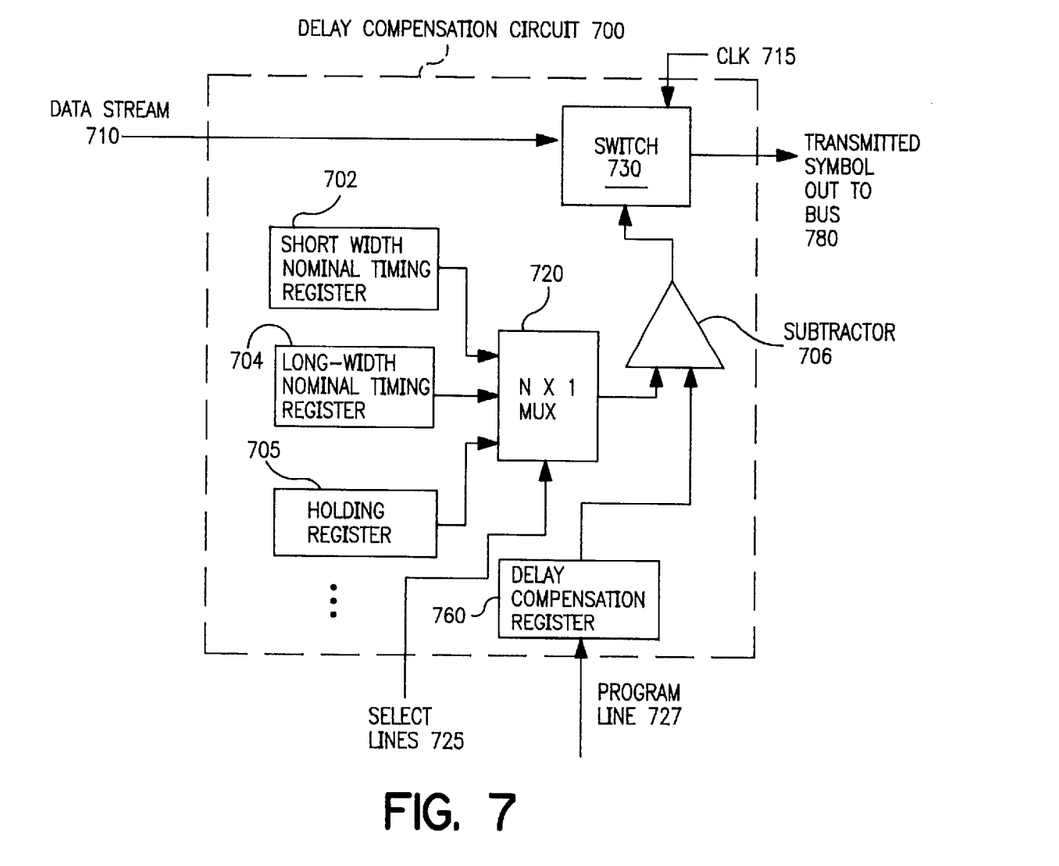
FIG. 7 is a schematic of delay compensation circuitry.

FIG. 7 is a schematic of delay compensation circuitry.

Within the micro-controller, a protocol handler (not shown) has a delay compensation circuit 700 which adjusts symbols from a VPW symbol encoder of the micro-controller into symbols which are delay compensated for the transceiver delay so that nominal bus symbol timings are observed.

Figure 8:
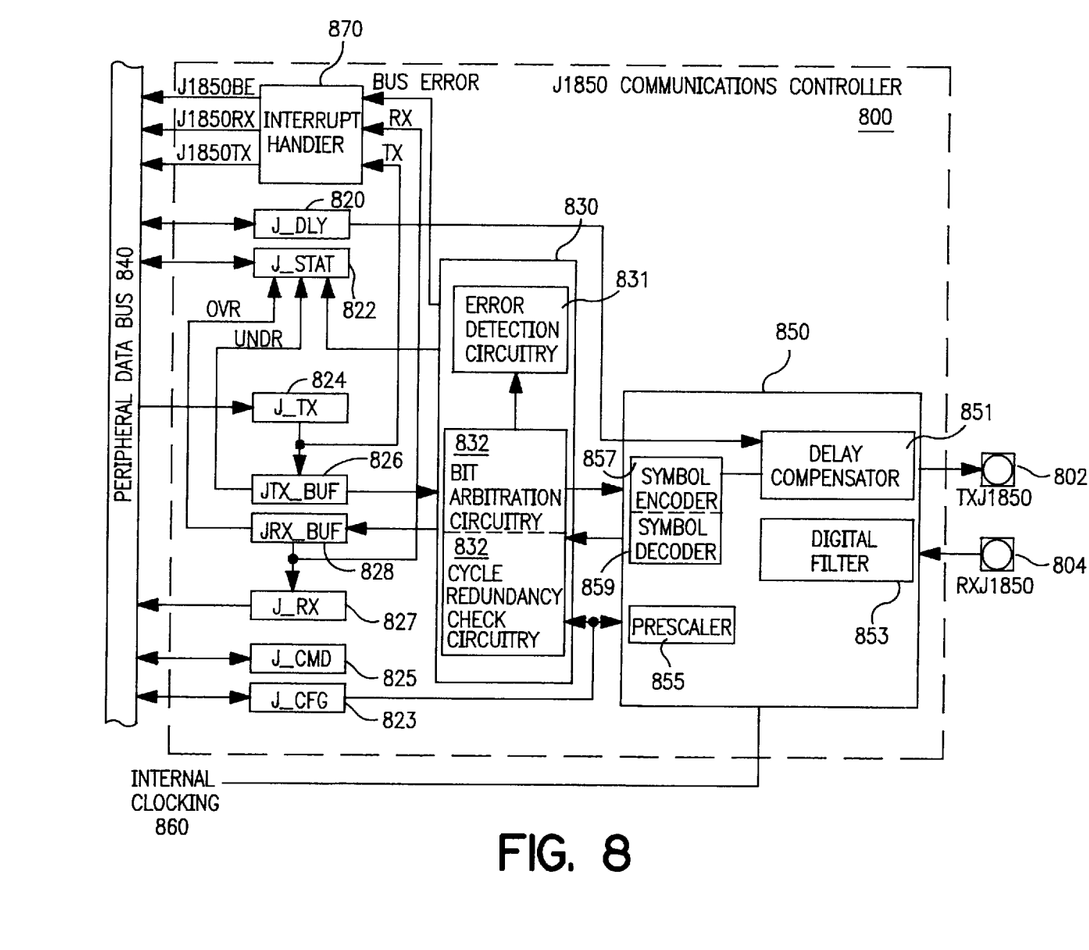
FIG. 8 shows a schematic diagram of one system employing programmable delay compensation.

In this embodiment, delay compensation circuit 700, has as input an encoded binary data stream 710 composed of serialized bits of data originating from the VPW symbol encoder (see FIG. 8). A clocking signal (CDK) 715 is input to delay compensation circuit 700 to time the length of the symbols.

A bus controller (not shown) sends from the peripheral data bus (see FIG. 8) the total delay, in units of microseconds, to a delay compensation register 760 provided on the micro-controller ($J_{13}$DLY register 820 of FIG. 8). Delay register 760, in one embodiment, has an 8-bit storage capacity with three bits reserved and five bits used to store the total measured delay in microseconds. The delay compensation register 760 sends the amount of delay to the compensation circuit 700. Register 760 is programmable in that it has a reset/load capability so that regardless of the transceiver used, register 760 may be reprogrammed by the user by the use of jumpers or through software by the use of the bus. Shown in FIG. 7 is a program line 727 to accommodate user programmability via the bus.

A set of registers, 702, 704 and 705, etc., holds nominal bus timings for various symbols (signals) to be transmitted. For instance, register 702 holds 64 μs as the bus specified timing for a short-width symbol, whereas register 704 holds 128 μs as the bus timing for a long-width symbol. Likewise, a register 705 and other such registers may hold values for error and control symbols as specified by J1850. Depending upon the symbol being encoded, an N by 1 multiplexer 720, where N is the total number of differently timed symbols/signals on the bus, which can select using select lines, the appropriate value from the corresponding registers 702, 704, 705, etc., is provided. Select line 725 controls the multiplexer 720 providing it with the right control signal from the encoder. A subtractor 706 will subtract from the multiplexer selected value the value stored in the delay compensation register 760. This difference, the output of subtractor 706, is input to a switch 730 which tells the TXJ1850 pin to toggle when the time specified by that difference has expired. As a result, an output symbol is held for a time that is shorter than the nominal time of J1850 specifications. Thus, the output symbol 780 is shorter in width than the nominal width by the value of the delay. Hence, when that symbol is observed back at the RXJ1850 received pin of the micro-controller (i.e., received back at the micro-controller), due to the addition of propagation delay, the symbol will have the nominal symbol timing as specified in registers 702 and 704 and, consequently, as specified by the J1850 specification. The RXJ1850 pin (shown in FIG. 8) receives as an echo the very symbol the micro-controller had previously transmitted in order to transition to the next symbol.

FIG. 8 shows a J1850 communications controller 800 which is a vital component of a node (referred to as "micro-controller"). Micro-controller 800 has the ability to interface to a transceiver to transmit and receive symbols. A TXJ1850 pin 802 is coupled to controller 800 for transmitting symbols to the transceiver and then out to the bus. A receive pin RXJ1850 804 is also coupled to controller 800 to receive symbols from the transceiver that are broadcast over the bus. J1850 communications controller (micro-controller) 800 uses an internal peripheral data bus 840 for communicating control, data and error signals between other components of the node of which micro-controller 800 is a part and the micro-controller. Peripheral data bus 840 is coupled to an interrupt handler 870 and to a set of six special function registers—$J_{13}DLY$ 820, $J_{13}STAT$ 822, $J_{13}TX$ 824, $J_{13}RX$ 827, $J_{13}CMD$ 825 and $J_{13}CFG$ 823. Other components of communications controller 800 include a control state machine 830 and a symbol synchronization and timing circuitry (SST) 850. Control state machine 830 consists of error detection circuitry 831, bit arbitration circuitry 832 and cyclic redundancy check (CRC) circuitry 834. Symbol synchronization and timing circuitry 850 is composed of a symbol encoder 857, a symbol decoder 859, a prescaler 855, a digital filter 853 and a delay compensation circuit 851. Further included as part of communications controller 800 are a transmit buffer $JTX_{13}BUF$ 826 and a receive buffer $JRX_{13}BUF$ 828.

Delay compensation circuit 851 and the register $J_{13}DLY$ 820, which is the delay compensation register, are critical to the invention. $J_{13}DLY$ 820 is a programmable register which is written to over peripheral data bus 840. According to one embodiment, a user or software sends the total propagation delay over bus 840 and writes the value, in microseconds, to the delay compensation register $J_{13}DLY$ 820. This value is then passed to delay compensation circuit 851 which uses the delay value to compensate the timing of symbols encoded by symbol encoder 857. At the TXJ1850 pin 802, a symbol is held for a width (time) specified by the delay compensation circuit 851. The time specified is ordinarily the nominal bus symbol time minus the value of the total delay as stored in $J_{13}DLY$ 820. An internal clocking signal 860 provides SST 850 with a reference for holding symbols the length of time specified as a result of compensator 851.

The remainder of the components are not directly related to the invention and are described in the J1850 -capable Intel Corporation manufactured 87C196LB micro-controller specification entitled "Integrated J1850 Protocol Provides for a Low-Cost Networking Solution" in SAE (Secretary of Automotive Engineers) Technical Papers Series #960123 on Feb. 26, 1996.

What is claimed is:

1. An apparatus for compensating delay in interfacing, using a specified protocol, a transceiver with a micro-controller, said apparatus comprising:

a delay compensation register coupled to said micro-controller, said delay compensation register programmed to store a delay compensation value for said transceiver; and delay compensation circuitry coupled to said delay compensation register for timing symbols on the micro-controller, said timing to vary from timings of said specified protocol, said variance a function of said delay compensation value.

2. An apparatus for compensating delay according to claim 1 wherein said delay compensation circuitry generates delay compensated output symbols when provided an input data stream.

3. An apparatus for compensating delay according to claim 2 wherein said delay compensation circuitry includes a set of registers, each register storing a nominal timing value according to said specified protocol for a symbol.

4. An apparatus for compensating delay according to claim 3 further comprising a multiplexer coupled to said set of registers, said multiplexer selecting one of said timing values stored in said registers, said selection dependent upon the symbol that said input data stream requires to be transmitted.

5. An apparatus for compensating delay according to claim 4 wherein said delay compensation circuitry includes a subtractor, said subtractor coupled to receive first operand from said delay compensation register, said subtractor further coupled to said multiplexer to receive a second operand from said multiplexer.

6. An apparatus for compensating delay according to claim 5 wherein said subtractor outputs a delay compensated timing which equals said first operand subtracted from said second operand.

7. An apparatus for compensating delay according to claim 6 wherein the delay compensated timing output by said subtractor is coupled to a switch, said switch holding a symbol at a certain logic level for an amount of time determined by said delay compensated timing.

8. A method for compensating delay in interfacing, using a specified protocol, a transceiver with a micro-controller, said transceiver coupled to a bus, said method comprising the steps of:

programming a delay compensation value in propagating symbols generated by the micro-controller through said transceiver; and adjusting said symbols generated by the micro-controller to match nominal timing values of said protocol after accounting for said compensation value delay.

9. A method for compensating delay according to claim 8 wherein the step of programming comprises the steps of:

programming an amount of delay in propagating a symbol originating from said micro-controller through said transceiver out to said bus; and programming an amount of delay in propagating an echo of said symbol originating from said micro-controller from said bus through said transceiver back to said micro-controller.

10. A method of compensating delay according to claim 9 wherein said step of programming said delay compensation value comprises the step of adding said amount of delay in propagating a symbol with said amount of delay in propagating an echo.

11. A method according to claim 8 wherein said step of adjusting said symbols includes the step of selecting a nominal timing value from a set of timing values based upon the type of symbol to be generated by said micro-controller.

12. A method of compensating delay according to claim 11 wherein said step of adjusting said symbols further includes the steps of:

subtracting said delay compensation value from said selected nominal timing value to generate a compensated symbol timing; and outputting a symbol by holding said symbol to its logic level for a duration specified by said compensated symbol timing.

13. A method of compensating delay according to claim 11 wherein said symbols include pulse-width modulated symbols, each of said symbols identified by a fixed nominal timing value.

14. On a bus having nodes, each node having a transceiver, an improved micro-controller coupled to said bus, said micro-controller comprising:

a delay compensation register coupled to said bus, said delay compensation register programmed to store a value corresponding to a delay compensation value for said transceiver, said value received from said bus; and a delay compensation circuit coupled to said delay compensation register, said delay compensation circuit adjusting the timing of symbols generated by said micro-controller utilizing said delay compensation value.

* * * * *

UNITED STATES PATENT AND TRADEMARK OFFICE
CERTIFICATE OF CORRECTION

PATENT NO. : 5,892,927
DATED : April 6, 1999
INVENTOR(S) : Boehmer, et al.

It is certified that error appears in the above-identified patent and that said Letters Patent is hereby corrected as shown below:

In column 7 at line 50 delete "specific" and insert -- specified --
In column 8 at line 53 delete "CDK" and insert -- CLK --

Signed and Sealed this

Twenty-sixth Day of September, 2000

Attest:

Q. TODD DICKINSON

Attesting Officer

Director of Patents and Trademarks